United States Patent
Wakita et al.

(10) Patent No.: US 8,659,402 B2
(45) Date of Patent: Feb. 25, 2014

(54) VARIBLE OPERATION SENSATION INPUT DEVICE

(75) Inventors: Yoshitsugu Wakita, Miyagi-Ken (JP); Shinji Ishikawa, Miyagi-Ken (JP)

(73) Assignee: Alps Electric Co., Ltd., Tokyo (JP)

(*) Notice: Subject to any disclaimer, the term of this patent is extended or adjusted under 35 U.S.C. 154(b) by 713 days.

(21) Appl. No.: 12/885,190

(22) Filed: Sep. 17, 2010

(65) Prior Publication Data
US 2011/0090069 A1    Apr. 21, 2011

(30) Foreign Application Priority Data

Oct. 16, 2009 (JP) .................. 2009-239353
Jul. 16, 2010 (JP) .................. 2010-161236

(51) Int. Cl.
H04B 3/36    (2006.01)
G08B 6/00    (2006.01)
G05G 9/00    (2006.01)
B60K 17/04   (2006.01)
G06F 3/033   (2013.01)
G06F 19/00   (2011.01)

(52) U.S. Cl.
USPC ............. 340/407.1; 340/407.2; 74/471 R; 74/473.12; 345/161; 463/38

(58) Field of Classification Search
USPC ...................................... 340/407.1
See application file for complete search history.

(56) References Cited

U.S. PATENT DOCUMENTS

| | | | | |
|---|---|---|---|---|
| 5,589,854 A * | 12/1996 | Tsai | .............. | 345/161 |
| 6,046,563 A * | 4/2000 | Moreyra | .............. | 318/567 |
| 6,104,382 A * | 8/2000 | Martin et al. | .............. | 345/161 |
| 6,192,771 B1 * | 2/2001 | Gouselis | .............. | 74/473.34 |
| 6,259,433 B1 * | 7/2001 | Meyers | .............. | 345/161 |
| 6,305,506 B1 * | 10/2001 | Shirai et al. | .............. | 188/72.2 |
| 6,307,486 B1 * | 10/2001 | Takeda et al. | .............. | 341/20 |
| 6,536,298 B1 * | 3/2003 | Bellur et al. | .............. | 74/469 |
| 6,854,352 B2 * | 2/2005 | Onodera | .............. | 74/471 XY |
| 6,909,205 B2 * | 6/2005 | Corcoran et al. | .............. | 310/12.14 |
| 7,061,466 B1 * | 6/2006 | Moore et al. | .............. | 345/156 |

(Continued)

FOREIGN PATENT DOCUMENTS

EP    1 932 711    6/2008
JP    2003-31074   1/2003

OTHER PUBLICATIONS

Office Action dated Nov. 28, 2012 from German Patent Application No. 102010048601.9.

*Primary Examiner* — Jennifer Mehmood
*Assistant Examiner* — John Mortell
(74) *Attorney, Agent, or Firm* — Beyer Law Group LLP

(57) ABSTRACT

A variable operation sensation input device includes: an operation member slidable along a plane including first and second directions perpendicular to each other; a first driving member including a first engagement portion driven by sliding movement of the operation member in the first direction; a second driving member including a second engagement portion driven by sliding movement of the operation member in the second direction; a first motor connected to the first driving member via a first power transmission section; a second motor connected to the second driving member via a second power transmission section; a first detection section detecting a movement state of the operation member in the first direction; a second detection section detecting a movement state of the operation member in the second direction; and a control section controlling a driving of the motors on the basis of outputs of the first and second detection sections.

7 Claims, 10 Drawing Sheets

(56) References Cited

U.S. PATENT DOCUMENTS

| | | | |
|---|---|---|---|
| 7,345,389 B2* | 3/2008 | Furuki | 310/68 C |
| 7,490,530 B2* | 2/2009 | Ishikawa et al. | 74/471 XY |
| 8,400,333 B2* | 3/2013 | Ishikawa et al. | 341/35 |
| 2002/0033841 A1* | 3/2002 | Rosenberg | 345/701 |
| 2006/0007150 A1* | 1/2006 | Onodera et al. | 345/163 |
| 2006/0283286 A1* | 12/2006 | Maeda et al. | 74/553 |

* cited by examiner

VARIABLE OPERATION SENSATION INPUT DEVICE

CROSS REFERENCE TO RELATED APPLICATIONS

The present invention contains subject matter related to Japanese Patent Application JP 2009-239353 filed in the Japanese Patent Office on Oct. 16, 2009 and Japanese Patent Application JP 2010-161236 filed in the Japanese Patent Office on Jul. 16, 2010, the entire contents of which being incorporated herein by reference.

BACKGROUND

1. Technical Field

The present invention relates to a variable operation sensation input device capable of obtaining an electrically controlled force sensation (an operation sensation) when manually sliding an operation member.

2. Related Art

In recent years, there have been proposed various types of variable operation sensation input devices having a force feedback function that helps to reliably perform a desired operation by applying a resistance force or a thrust force in accordance with an operation amount or an operation direction of an operation member when manually operating the operation member to select the functions of an in-car control device such as an air conditioner, an audio player, or a navigation.

An example of the variable operation sensation input devices is disclosed in Japanese Unexamined Patent Application Publication No. 2003-31074, the variable operation sensation input device including: an operation member that is slidable in an arbitrary direction along a predetermined plane including the X and Y directions perpendicular to each other; a first driving member that is driven in the X direction in accordance with the sliding movement of the operation member; a second driving member that is driven in the Y direction in accordance with the sliding movement of the operation member; a first motor that has a gear fixed to a motor shaft and meshing with the first driving member; a second motor that has a gear fixed to a motor shaft and meshing with the second driving member; a first detection section that detects the rotation state of the first motor; a second detection section that detects the rotation state of the second motor; and a control section that controls the driving of each of the motors. The first driving member is supported so as to be linearly movable in the X direction, and the first driving member slidably engages with a first guide rail extending in the Y direction and integrated with the operation member. In the same way, the second driving member is supported so as to be linearly movable in the Y direction, and the second driving member slidably engages with a second guide rail extending in the X direction and integrated with the operation member.

In the existing variable operation sensation input device, when a user manually slides the operation member, for example, in the X direction, the first driving member is driven in the X direction to rotate the motor shaft of the first motor, where the rotation direction or the rotation amount is detected by the first detection section. Then, the rotation force of the first motor is applied to the operation member via the first driving member in such a manner that the control section controls the driving of the first motor on the basis of the output of the first detection section, thereby enabling the transmission of an appropriate force sensation (an operation sensation) such as a resistance feeling to the user's finger. At this time, since the second guide rail slides without pushing the second driving member, the second driving member does not move. In the same way, when the operation member slides in the Y direction, the first driving member does not move, but the second driving member is driven in the Y direction to rotate the motor shaft of the second motor, where the rotation direction or the rotation amount is detected by the second detection section. Then, the rotation force of the second motor is applied to the operation member via the second driving member in such a manner that the control section controls the driving of the second motor on the basis of the output of the second detection section, thereby enabling the transmission of an appropriate force sensation to the user's finger. In addition, when the operation member slides in a direction oblique with respect to the X and Y directions, the first and second driving members are driven respectively so as to rotate the motor shafts of the first and second motors. For this reason, the rotation force of each of the motors is applied to the operation member in such a manner that the control section controls the drivings of the first and second motors on the basis of the outputs of the first and second detection section, thereby enabling the transmission of an appropriate force sensation to the user's finger.

However, in the existing variable operation sensation input device, when the first and second driving members are respectively supported to be slidable in the movement direction by the guide members, it is desirable in that the driving members move smoothly and linearly. However, in this case, rattling easily occurs in the driving members when the support structure decreases in size. For this reason, a problem arises in that the support structure increases in size in order to suppress the rattling of the driving members.

SUMMARY

An advantage of some aspects of the invention is to provide a variable operation sensation input device capable of suppressing rattling of a movable member while easily decreasing the size thereof.

In order to achieve the above-described object, according to an aspect of the invention, there is provided a variable operation sensation input device including: an operation member which is slidable along a plane including first and second directions perpendicular to each other; a first driving member which includes a first engagement portion driven by sliding movement of the operation member in the first direction; a second driving member which includes a second engagement portion driven by sliding movement of the operation member in the second direction; a first motor which is connected to the first driving member via a first power transmission section; a second motor which is connected to the second driving member via a second power transmission section; a first detection section which detects a movement state of the operation member in the first direction; a second detection section which detects a movement state of the operation member in the second direction; and a control section which controls a driving of the first and second motors on the basis of outputs of the first and second detection sections, wherein the first and second driving members are respectively supported so as to be rotatable along the plane.

In the variable operation sensation input device with such a configuration, when the user manually slides the operation member, for example, in the first direction, the first driving member is rotationally driven via the first engagement portion to rotate the motor shaft of the first motor, where the sliding movement state of the operation member in the first direction can be detected by the first detection section. In the same way, when the user slides the operation member in the second direction, the second driving member is rotationally driven via the second engagement portion to rotate the motor shaft of the second motor, where the sliding movement state of the operation member in the second direction can be detected by the second detection section. In addition, when the operation member slides in a direction oblique with respect to the first and second directions, all the motor shafts of the first and second motor rotate. For this reason, the components in the first and second directions representing the movement state of the operation member can be detected respectively. Then, the rotation force of each of the motors is applied to the operation member via each of the driving members by controlling the driving of each of the motors on the basis of the output of each of the detection sections, thereby enabling the transmission of an appropriate force sensation (an operation sensation) to the user's finger. In addition, since the operation member, the driving members, and the motors can be simultaneously and compactly disposed within a narrow area in a plan view, it is possible to easily decrease the size of the entire input device. Further, since the structure is simple, it is possible to prevent an increase in the cost of the input device. Furthermore, since the driving members driven by the operation member are rotatably supported, there is no risk of rattling occurring in the driving members during the sliding movement of the operation member.

In the above-described configuration, any one of the operation member and the first driving member may include a first guide portion which extends in the second direction and is formed in a groove shape or an elongated hole shape, and the other thereof may include a first protrusion portion which is slidably inserted in the first guide portion. When the first engagement portion of the first driving member is the first protrusion portion formed in the first driving member or the first guide portion formed in the first driving member, the first driving member may be smoothly and rotationally driven in accordance with the sliding movement of the operation member in the first direction.

In the above-described configuration, any one of the operation member and the second driving member may include a second guide portion which extends in the first direction and is formed in a groove shape or an elongated hole shape, and the other thereof may include a second protrusion portion which is slidably inserted in the second guide portion. When the second engagement portion of the second driving member is the second protrusion portion formed in the second driving member or the second guide portion formed in the second driving member, the second driving member may be smoothly and rotationally driven in accordance with the sliding movement of the operation member in the second direction.

In the above-described configuration, the variable operation sensation input device further includes: an assisting driving member which is supported so as to be rotatable along the plane and wherein the first engagement portion of the first driving member and the assisting engagement portion of the assisting driving member may be adapted to move together. Accordingly, a rotation of the operation member that is a cause for concern may be prevented during the sliding movement of the operation member. That is, when the assisting driving member is not provided, the operation member may slightly rotate as the operation member slides in the first direction to change a position relative to the first engagement portion of the first driving member. However, when the assisting engagement portion of the assisting driving member engages with the operation member, such undesired rotation can be prevented in advance.

Even in this case, the first driving member and the assisting driving member may be directly connected to each other so that they mesh with each other at a position distanced from its rotation centers by the same distance and rotate in the opposite directions. Alternatively, a gear connected to a rotation shaft of the first motor may be interposed between the first driving member and the assisting driving member, and the gear may mesh with both a tooth portion formed in the first driving member and a tooth portion formed in the assisting driving member.

In the above-described configuration, any one of the operation member and the assisting driving member may include a third guide portion which extends in the second direction and is formed in a groove shape or an elongated hole shape, and the other thereof may include a third protrusion portion which is slidably inserted in the third guide portion. When the assisting engagement portion is the third protrusion portion formed in the assisting driving member or the third guide portion formed in the assisting driving member, the assisting driving member may be smoothly and rotationally driven in accordance with the sliding movement of the operation member in the first direction.

According to the variable operation sensation input device of the embodiment of the invention, when the user manually slides the operation member along a predetermined plane, the first driving member or the second driving member is rotationally driven to rotate the motor shaft of the first motor or the second motor, and the sliding movement state of the operation member is detected by detecting the rotation information via the detection sections. Accordingly, the rotation force of each of the motors is applied to the operation member by controlling the driving of each of the motors on the basis of the output of each of the detection sections, thereby enabling the transmission of an appropriate force sensation (an operation sensation) to the user's finger. In addition, since the operation member, the driving members, and the motors can be simultaneously and compactly disposed within a narrow area in a plan view, it is possible to easily decrease the size of the entire input device. Further, since the structure is simple, it is possible to prevent an increase in the cost of the input device. Furthermore, since the driving members driven by the operation member are rotatably supported, there is no risk of rattling occurring in the driving members during the sliding movement of the operation member, and hence satisfactory operability can be expected.

DESCRIPTION OF EXEMPLARY EMBODIMENTS

Figure 1:
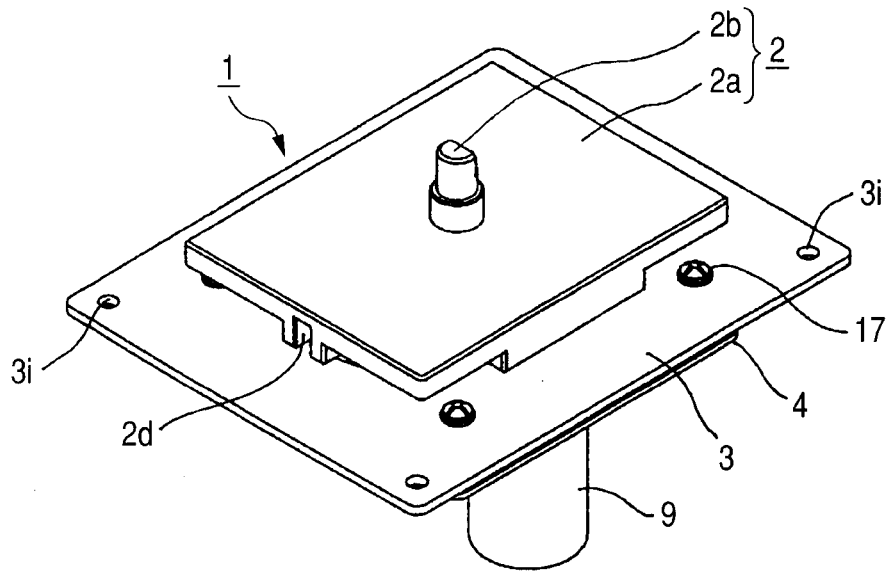
FIG. 1 is an external view illustrating a variable operation sensation input device according to a first embodiment of the invention when obliquely viewed from the upside thereof.

Hereinafter, a first embodiment of the invention will be described with reference to FIGS. 1 to 12. A variable operation sensation input device 1 according to the embodiment has an external shape shown in FIGS. 1 to 3, and includes components shown in FIG. 4. That is, the variable operation sensation input device 1 mainly includes an operation member 2 which is formed by forming an attachment portion 2b at the center portion of an upper surface of a slider 2a so as to protrude therefrom; upper and lower support plates 3 and 4 which are integrated with each other while facing each other with cylindrical spacers 5 interposed therebetween; a first driving member 6, a second driving member 7, and an assisting driving member 8 which are axially supported to both support plates 3 and 4 so as to be rotatable; a first motor 9 which has a gear 10 fixed to a motor shaft 9a; a second motor 11 which has a gear 12 fixed to a motor shaft 11a; a pair of sensors 13 and 14 which detects the rotation state of the motor shafts 9a and 11a; and a circuit board 15 which is used to mount the first and second motors 9 and 11 or the sensors 13 and 14 thereon. A control circuit 16 is provided on the circuit board 15 so as to control the driving of each of the motors 9 and 11.

An operation handle (not shown) is attached to the attachment portion 2b of the operation member 2, and the operation member 2 is operated to slide by a user's finger gripping the operation handle. The operation member 2 is slidable in an arbitrary direction along a predetermined plate including the X and Y directions of FIG. 4, and the X direction is perpendicular to the Y direction. In addition, both support plates 3 and 4 or the circuit board 15 are disposed to be parallel to the predetermined plate, and the rotation plane of each of the driving members 6, 7, and 8 is also parallel to the predetermined plane. The rear surface of the slider 2a of the operation member 2 is provided with a pair of guide grooves 2c and 2d which extends in the Y direction and a guide groove 2e which extends in the X direction (refer to FIG. 6). A protrusion portion 6b of the first driving member 6 is slidably inserted in the guide groove 2c, and a protrusion portion 8b of the assisting driving member 8 is slidably inserted in the guide groove 2d. In addition, a protrusion portion 7b of the second driving member 7 is slidably inserted in the guide groove 2e.

Four support protrusions 3a are provided in the upper support plate 3 in a protruding manner so as to mount the operation member 2 thereon, and the operation member 2 is adapted to be slidable by using the upper surfaces of the support protrusions 3a as sliding surfaces. The upper support plate 3 is provided with a bearing portion 3b which axially supports the upper end portion of a support shaft 6a of the first driving member 6, a bearing portion 3c which axially supports the upper end portion of a support shaft 8a of the assisting driving member 8, and a bearing portion 3d which axially supports the upper end portion of a support shaft 7a of the second driving member 7. In addition, the upper support plate 3 is provided with an escape hole 3e through which the protrusion portion 6b of the first driving member 6 is loosely inserted, an escape hole 3f through which the protrusion portion 8b of the assisting driving member 8 is loosely inserted, and an escape hole 3g through which the protrusion portion 7b of the second driving member 7 is loosely inserted, where each of the escapes holes is formed in an elongated hole shape. Further, the upper support plate 3 is provided with perforation holes 3h which are respectively located directly above the spacers 5, and attachment holes 3i which are located at four corners. A fixed screw 17 is inserted through each perforation hole 3h and is threaded into the spacer 5. Each of the attachment holes 3i is used as a screw insertion hole when the upper support plate 3 is attached to an external device (not shown).

The lower support plate 4 is provided with a bearing portion 4a which axially supports the lower end portion of the support shaft 6a of the first driving member 6, a bearing portion 4b which axially supports the lower end portion of the support shaft 8a of the assisting driving member 8, and a bearing portion 4c which axially supports the lower end portion of the support shaft 7a of the second driving member 7. In addition, the lower support plate 4 is provided with a pair of annular holes 4d and 4e through which the motor shafts 9a and 11a are respectively inserted, and perforation holes 4f which are located at four corners directly below the spacers 5, where the fixed screw 18 is inserted through each of the perforation holes 4f and is threaded into the spacer 5.

Figure 2:
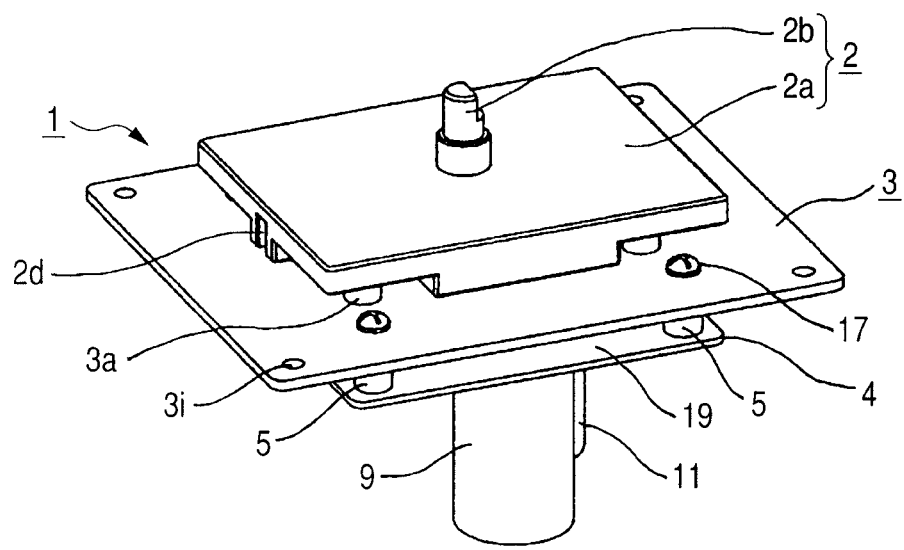
FIG. 2 is an external view illustrating the input device when obliquely viewed from the upside thereof in a direction different from FIG. 1.
Figure 3:
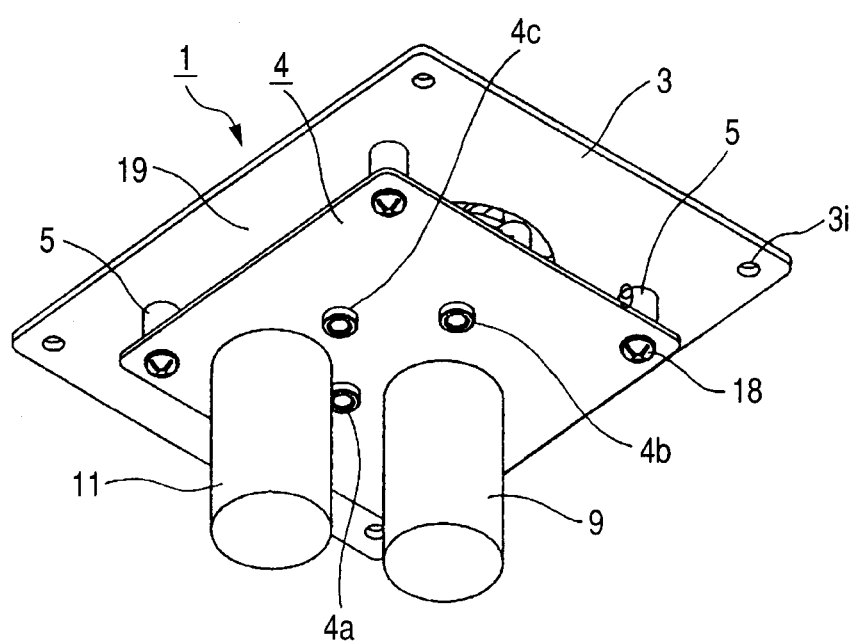
FIG. 3 is an external view illustrating the input device when obliquely viewed from the downside thereof.
Figure 4:
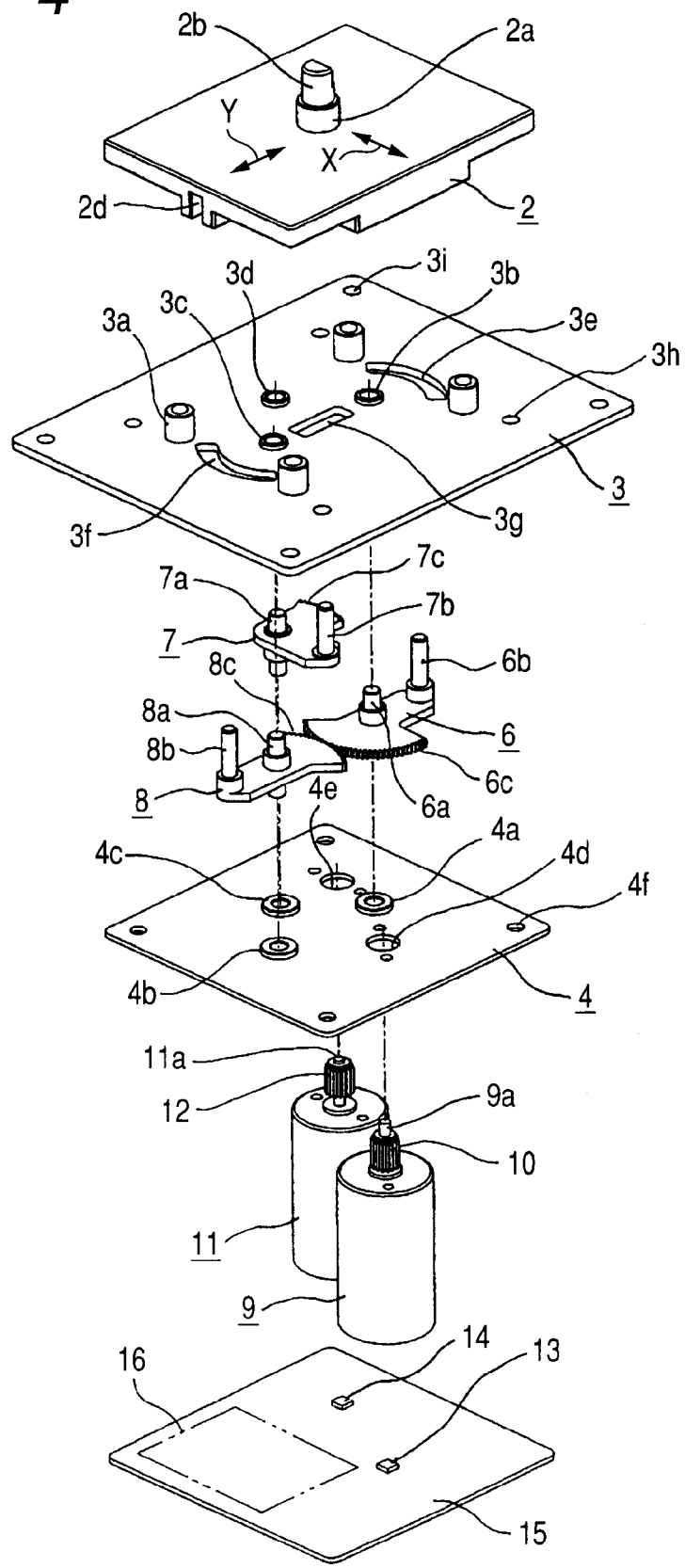
FIG. 4 is an exploded perspective view illustrating the components of the input device.
Figure 5:
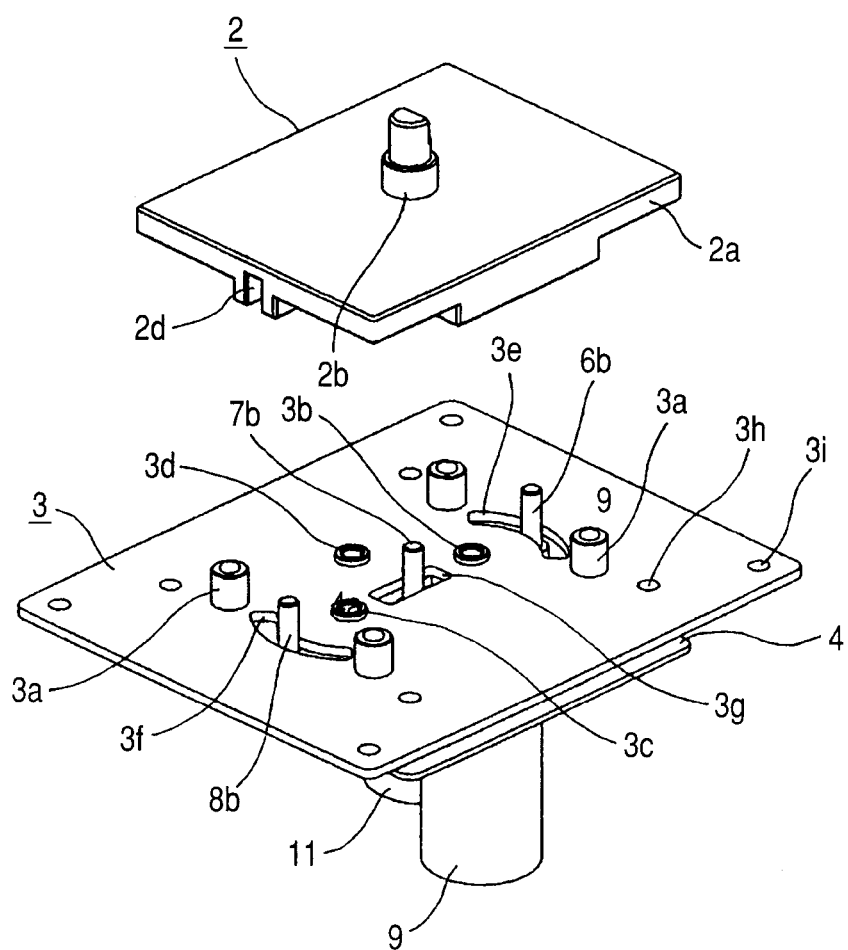
FIG. 5 is an exploded perspective view illustrating a state where an operation member is removed from the input device.
Figure 6:
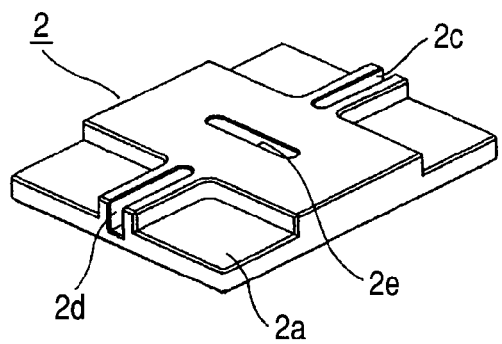
FIG. 6 is a perspective view illustrating a shape of the rear surface of the operation member.
Figure 7:
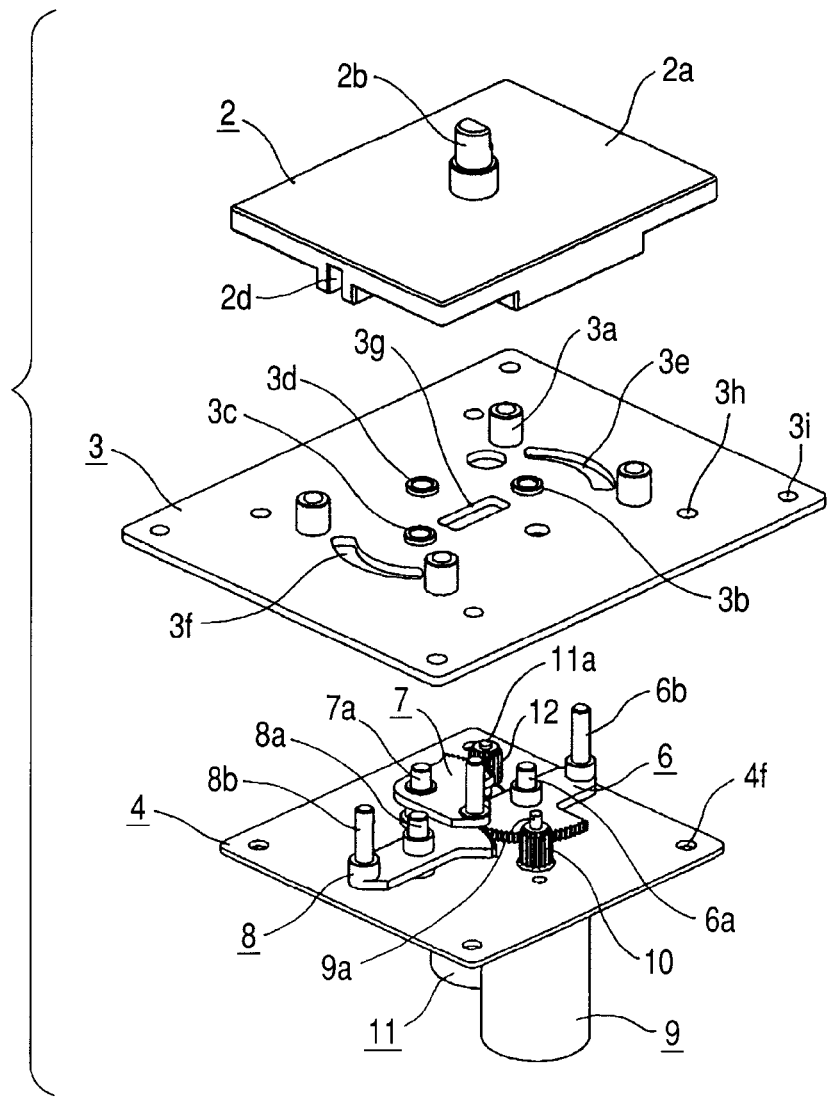
FIG. 7 is an exploded perspective view illustrating a state where the operation member and the upper support plate are removed from the input device.
Figure 8:
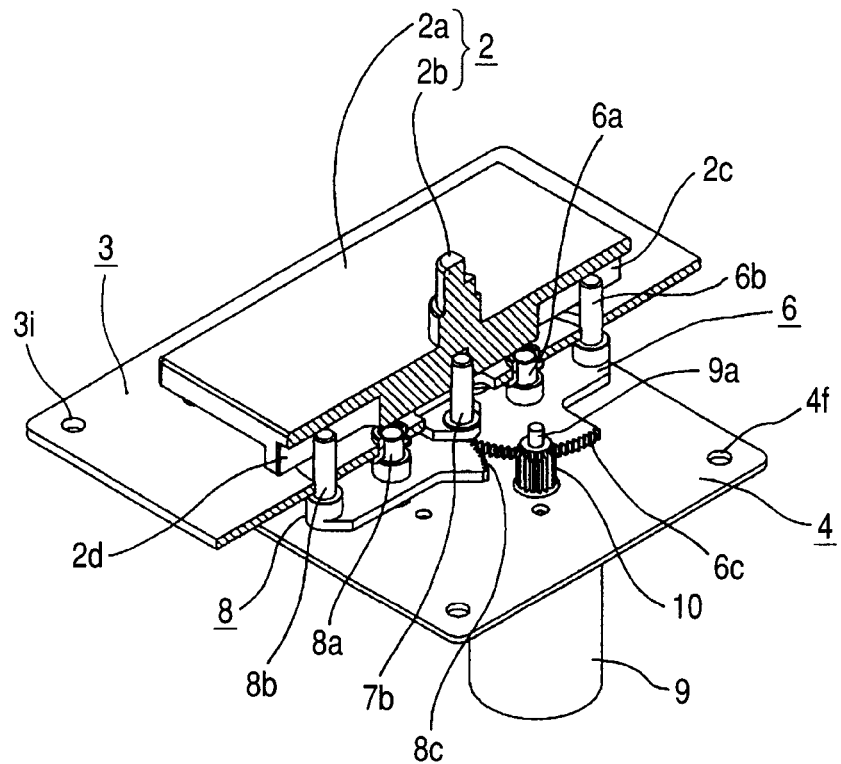
FIG. 8 is a partially cross-sectional perspective view illustrating the internal structure of the input device.
Figure 9:
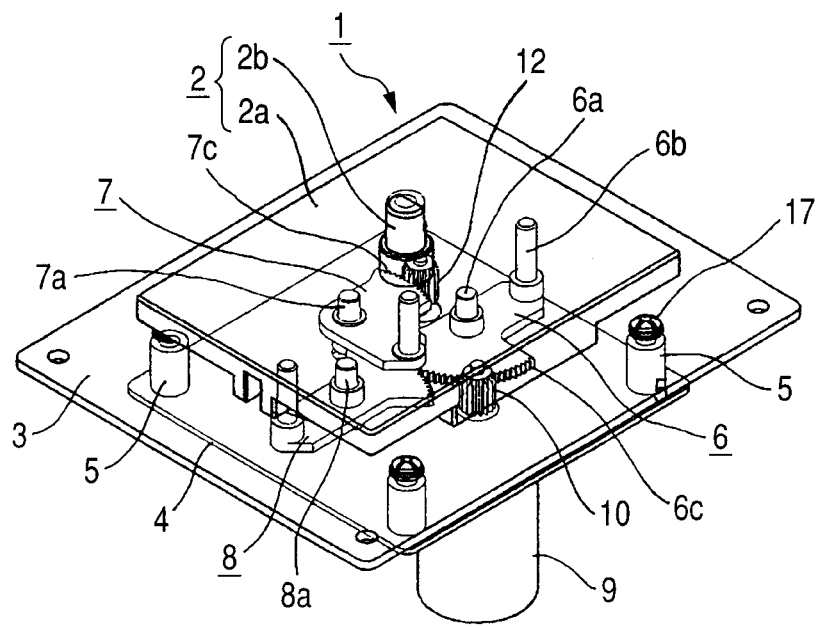
FIG. 9 is an explanatory diagram transparently illustrating the internal structure of the input device and corresponding to FIG. 1.
Figure 10:
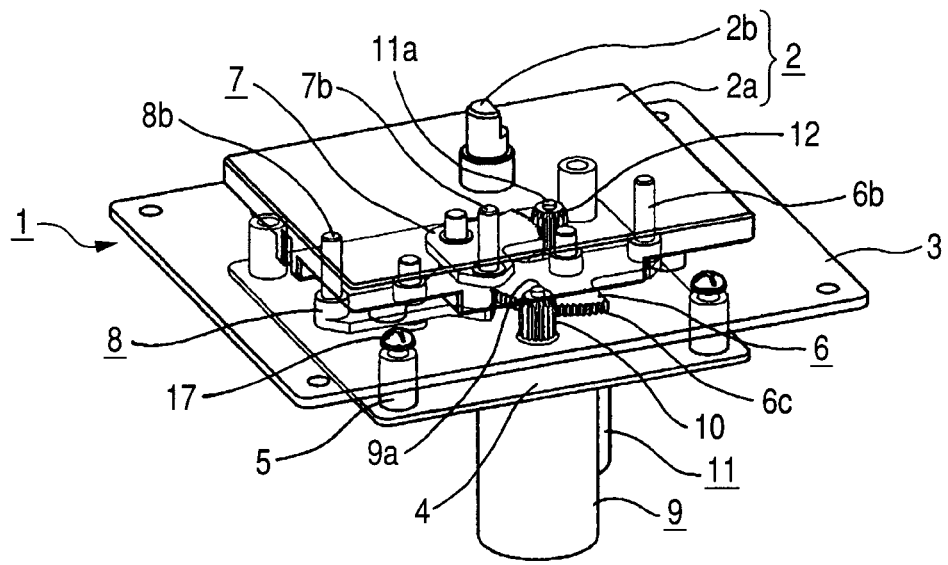
FIG. 10 is an explanatory diagram transparently illustrating the internal structure of the input device and corresponding to FIG. 2.
Figure 11:
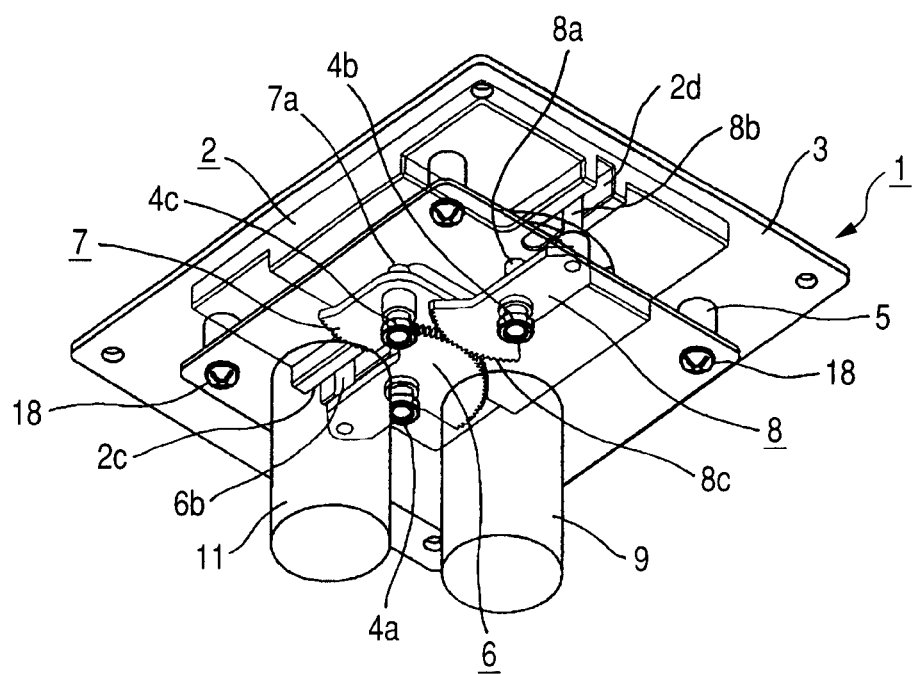
FIG. 11 is an explanatory diagram transparently illustrating the internal structure of the input device and corresponding to FIG. 3.

That is, as shown in FIGS. 2 and 3, the upper support plate 3 and the lower support plate 4 are integrated with each other via four spacers 5, and the gears 10 and 12 fixed to the motor shafts 9a and 11a are disposed in a gap 19 defined between both support plates 3 and 4. Then, as shown in FIG. 9 or 10, one gear 10 meshes with a tooth portion 6c of the first driving member 6, and the other gear 12 meshes with a tooth portion 7c of the second driving member 7. Accordingly, the first driving member 6 rotates along with the motor shaft 9a, and the second driving member 7 rotates along with the motor shaft 11a.

The first driving member 6 is rotatable about the support shaft 6a, where the protrusion portion 6b engaging with the guide groove 2c of the operation member 2 protrudes upward, and the tooth portion 6c meshing with the gear 10 is disposed inside the gap 19 between both support plates 3 and 4. Since the guide groove 2c extends in the Y direction, when the operation member 2 slides in the X direction, the protrusion portion 6b is driven in the same direction, thereby rotating the first driving member 6. Then, the protrusion portion 6b slides inside the guide groove 2c in accordance with the rotation, and the tooth portion 6c drives the gear 10, thereby rotating the motor shaft 9a of the first motor 9. However, since the range of sliding the operation member 2 in the X direction is restricted, as shown in FIGS. 12A to 12I, the movable range of the protrusion portion 6b is restricted to the position distanced from the support shaft 6a to one side (the upside in the same drawing) in the Y direction by the radius of rotation of the protrusion portion 6b or the vicinity thereof. Accordingly, during the rotation of the first driving member 6, the protrusion portion 6b is movable only in the X direction and a direction forming an acute angle with respect to the X direction.

Figure 12:
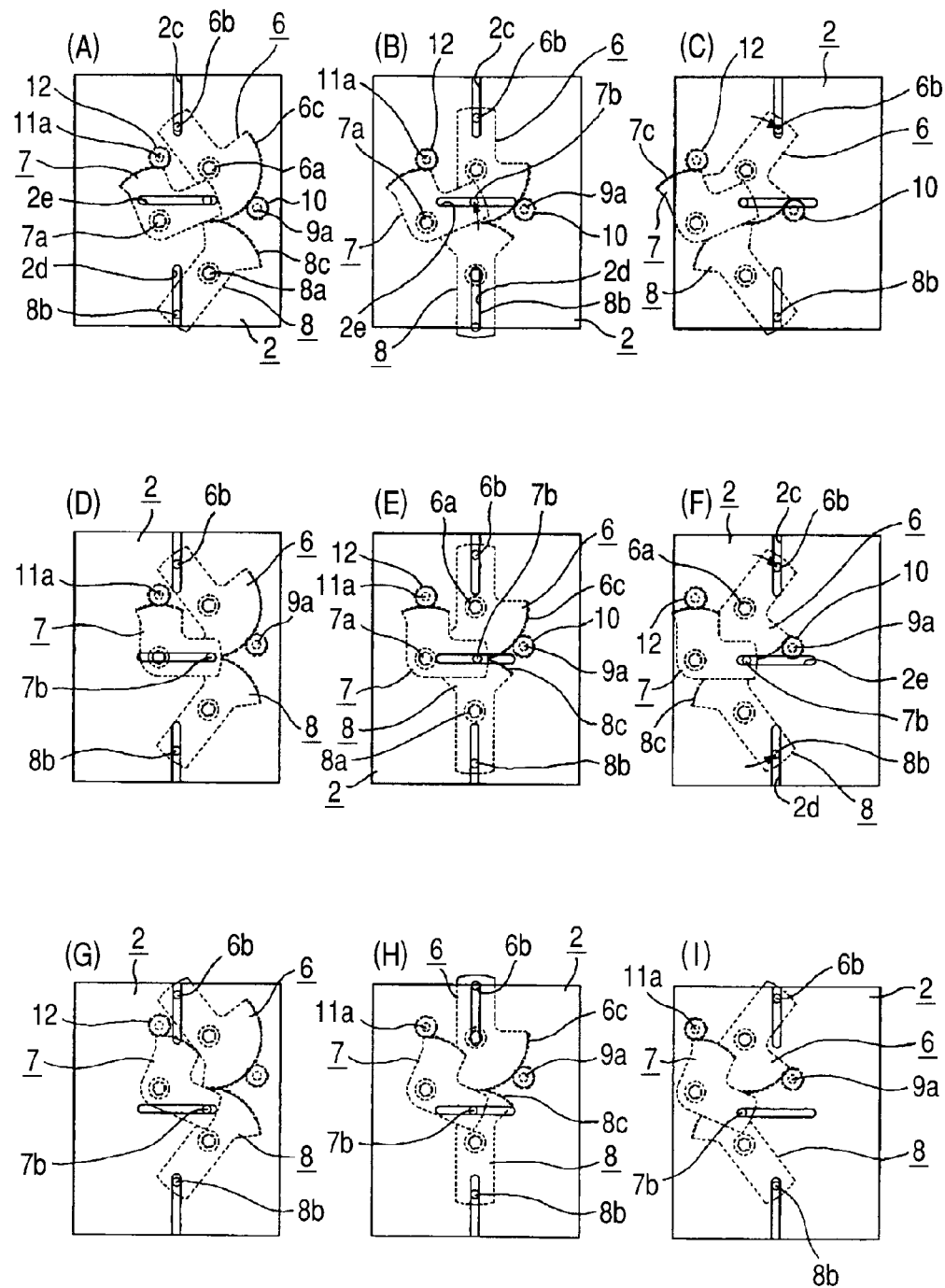
FIGS. 12A to 12I are explanatory diagrams illustrating the operation of the input device.

The assisting driving member 8 is rotatable about the support shaft 8a, where the protrusion portion 8b engaging with the guide groove 2d of the operation member 2 protrudes upward, and the tooth portion 8c meshing with the tooth portion 6c of the first driving member 6 is disposed inside the gap 19 between both support plates 3 and 4. As shown in FIG. 12, the support shaft 8a and the protrusion portion 8b of the assisting driving member 8 are line-symmetric with the support shaft 6a and the protrusion portion 6b of the first driving member 6, and the assisting driving member 8 and the first driving member 6 rotate in the opposite directions while meshing with each other at the position distanced from its rotation centers by the same distance. That is, since the guide groove 2d extends in the Y direction as in the guide groove 2c, when the operation member 2 slides in the X direction, the protrusion portion 8b is driven in the same direction so that the assisting driving member 8 rotates in the opposite direction of the first driving member 6, and the protrusion portion 8b slides inside the guide groove 2d in accordance with the rotation. In addition, as shown in FIGS. 12A to 12I, the movable range of the protrusion portion 8b is restricted to the position distanced from the support shaft 8a to the other side (the downside in the same drawing) in the Y direction by the radius of rotation of the protrusion portion 8b or the vicinity thereof. Accordingly, during the rotation of the assisting driving member 8, the protrusion portion 8b is movable only in the X direction and a direction forming an acute angle with respect to the X direction.

The second driving member 7 is rotatable about the support shaft 7a, where the protrusion portion 7b engaging with the guide groove 2e of the operation member 2 protrudes upward, and the tooth portion 7c meshing with the gear 12 is disposed inside the gap 19 between both support plates 3 and 4. Since the guide groove 2e extends in the X direction, when the operation member 2 slides in the Y direction, the protrusion portion 7b is driven in the same direction, thereby rotating the second driving member 7. Then, the protrusion portion 7b slides inside the guide groove 2e in accordance with the rotation, and the tooth portion 7c drives the gear 12, thereby rotating the motor shaft 11a of the second motor 11. However, since the range of sliding the operation member 2 in the Y direction is restricted, as shown in FIGS. 12A to 12I, the movable range of the protrusion portion 7b is restricted to the position distanced from the support shaft 7a to one side in the X direction by the radius of rotation of the protrusion portion 7b or the vicinity thereof. Accordingly, during the rotation of the second driving member 7, the protrusion portion 7b is movable only in the Y direction and a direction forming an acute angle with respect to the Y direction.

All the motor shafts 9a and 11a of the first and second motors 9 and 11 are perpendicular to the movement plane of the slidable operation member 2 or the rotation planes of the driving members 6 to 8. For this reason, the gear 10 as a power transmission section of the first driving member 6 and the motor shaft 9a or the gear 12 as a power transmission section of the second driving member 7 and the motor shaft 11a can reliably transmit power, and can be formed at a low cost while having a small diameter.

The sensor 13 is disposed on the circuit board 15 so as to be covered by the first motor 9, and the sensor 13 detects the rotation direction and the rotation amount of the motor shaft 9a, thereby enabling the detection of the movement state of the operation member 2 in the X direction by the use of the sensor 13. In the same manner, the sensor 14 is disposed on the circuit board 15 so as to be covered by the second motor 11, and the sensor 14 detects the rotation direction and the rotation amount of the motor shaft 11a, thereby enabling the detection of the movement state of the operation member 2 in the Y direction by the use of the sensor 14. In addition, the control circuit 16 formed on the circuit board 15 is designed to control the driving of the first motor 9 on the basis of the output of the sensor 13, and to control the driving of the second motor 11 on the basis of the output of the sensor 14.

Next, the sliding operation of the variable operation sensation input device 1 with the above-described configuration will be described with reference to FIG. 12. Here, FIG. 12E indicates the state where the operation member 2 is located at a neutral position. At this time, the line extending in the Y direction so as to pass through the center of the operation member 2 overlaps with the protrusion portion 6b of the first driving member 6 and the protrusion portion 8b of the assisting driving member 8, and the line extending in the X direction so as to pass through the center of the operation member 2 overlaps with the protrusion portion 7b of the second driving member 7.

When the user manually slides the operation member 2 to one side (the right of the same drawing) in the X direction from the state shown in FIG. 12E, the protrusion portions 6b and 8b are driven by the operation member 2. Accordingly, the first driving member 6 rotates in the clockwise direction in the same drawing, and the assisting driving member 8 rotates in the counter-clockwise direction in the same drawing, thereby entering the state shown in FIG. 12F. At this time, the protrusion portion 6b displaces downward in the same drawing within the guide groove 2c, and the protrusion portion 8b displaces upward in the same drawing within the guide groove 2d. However, since the protrusion portion 7b moves only in the length direction within the guide groove 2e, the second driving member 7 does not rotate. Further, since the tooth portion 6c drives the gear 10 in accordance with the rotation of the first driving member 6, the motor shaft 9a of the first motor 9 rotates along with the first driving member 6. Since the rotation state of the motor shaft 9a is detected by the sensor 13, the movement state of the operation member 2 in the X direction is detected, and the control circuit 16 controls the driving of the first motor 9 on the basis of the detection result of the sensor 13. Accordingly, the rotation force of the first motor 9 is applied to the operation member 2 via the first driving member 6 and the assisting driving member 8, thereby enabling the transmission of an appropriate force sensation (an operation sensation) such as a resistance sensation to the user's finger. In addition, since the first driving member 6 and the assisting driving member 8 rotate in the opposite directions while the protrusion portions 6b and 8b line-symmetric with each other engage with the operation member 2, the operation member 2 does not rotate when the operation member 2 slides in the X direction. Further, since the first driving member 6 meshing with the gear 10 or the assisting driving member 8 meshing with the driving member 6 is rotatably supported, there is no risk of rattling occurring in both driving members 6 and 8 which are driven by the sliding movement of the operation member 2.

When the user slides the operation member 2 to the other side (the left of the same drawing) in the X direction from the state shown in FIG. 12E, the first driving member 6 rotates in the counter-clockwise direction in the same drawing, and the assisting driving member 8 rotates in the clockwise direction in the same drawing, thereby entering the state shown in FIG. 12D. Here, the basic operation is the same as the above-described example. However, the rotation direction of the motor shaft 9a driven by the tooth portion 6c of the first driving member 6 is opposite to that of the above-described example.

When the user slides the operation member 2 to one side (the upside of the same drawing) in the Y direction from the state shown in FIG. 12E, the protrusion portion 7b is driven by the operation member 2. Accordingly, even when the second driving member 7 rotates in the counter-clockwise direction of the same drawing, the operation member 2 enters the state shown in FIG. 12B. At this time, since the protrusion portions 6b and 8b respectively move only in the length direction within the guide grooves 2c and 2d, the first driving member 6 or the assisting driving member 8 does not rotate. In addition, since the tooth portion 7c drives the gear 12 in accordance with the rotation of the second driving member 7, the motor shaft 11a of the second motor 11 rotates along with the second driving member 7. Since the rotation state of the motor shaft 11a is detected by the sensor 14, the movement state of the operation member 2 in the Y direction is detected, and the control circuit 16 controls the driving of the second motor 11 on the basis of the detection result of the sensor 14. Accordingly, the rotation force of the second motor 11 is applied to the operation member 2 via the second driving member 7, thereby enabling the transmission of the appropriate force sensation to the user's finger. Further, even in this case, the rotation of the operation member 2 is suppressed by the protrusion portions 6b and 8b. In addition, since the second driving member 7 meshing with the gear 12 is rotatably supported, there is no risk of rattling occurring in the second driving member 7 which is driven by the sliding movement of the operation member 2.

When the user slides the operation member 2 to the other side (the downside of the same drawing) in the Y direction from the state shown in FIG. 12E, the second driving member 7 rotates in the clockwise direction to enter the state shown in FIG. 12H. Here, the basic operation is the same as the above-described example. However, the rotation direction of the motor shaft 11a driven by the tooth portion 7c of the second driving member 7 is opposite to that of the above-described example.

Next, the operation will be described in which the user slides the operation member 2 in a direction oblique with respect to the X and Y directions from the state shown in FIG. 12E. For example, when the user slides the operation member 2 in the oblique right-up direction of the same drawing from the state shown in FIG. 12E, the protrusion portion 6b of the first driving member 6 and the protrusion portion 8b of the assisting driving member 8 are driven to one side (the right of the same drawing) in the X direction. Accordingly, the motor shaft 9a rotates along with the first driving member 6, and the protrusion portion 7b of the second driving member 7 is driven to one side (the upside of the same drawing) in the Y direction, thereby rotating the motor shaft 11a along with the second driving member 7. As a result, the driving members 6 to 8 enter the state shown in FIG. 12C. In this case, since the operation member 2 moves in the X and Y directions, the components in the X and Y directions representing a variation in the position of the operation member 2 are detected. That is, the movement state of the operation member 2 in the X and Y directions is detected by the sensors 13 and 14, and the rotation forces of the first and second motors 9 and 11 driven on the basis of the detection result are applied to the operation member 2, thereby enabling the transmission of the appropriate force sensation to the user's finger.

The basic operation of the above-described example is the same as that of the operation in which the user slides the operation member 2 in the oblique left-up direction of the same drawing from the state shown in FIG. 12E so as to enter the state shown in FIG. 12A, the operation in which the user slides the operation member 2 in the oblique right-down direction of the same drawing so as to enter the state shown in FIG. 12I, or the operation in which the user slides the operation member 2 in the oblique left-down direction of the same drawing so as to enter the state shown in FIG. 12G.

As described above, in the variable operation sensation input device 1 according to the embodiment, when the user manually slides the operation member 2 in an arbitrary direction along a predetermined plane, the first driving member 6 and the assisting driving member 8 are rotationally driven in accordance with the component in the X direction of a variation in the position of the operation member 2 so as to rotate the motor shaft 9a of the first motor 9. Also, the second driving member 7 is rotationally driven in accordance with the component in the Y direction of a variation in the position of the operation member 2 so as to rotate the motor shaft 11a of the second motor 11. For this reason, the rotation forces of the motors 9 and 11 are applied to the operation member 2 by controlling the drivings of the motors 9 and 11 on the basis of the detection results of the sensors 13 and 14 detecting the movement state of the operation member 2 in the X and Y directions, thereby enabling the transmission of the appropriate force sensation to the user's finger. In addition, since the operation member 2, the driving members 6 to 8, and the motors 9 and 11 can be simultaneously and compactly disposed within a narrow area in a plan view, it is possible to easily decrease the size of the entire input device. Further, since the structure is simple, it is possible to prevent an increase in the cost of the input device. Furthermore, since the driving members 6 to 8 driven by the operation member 2 are rotatably supported, there is no risk of rattling occurring in the driving members 6 to 8 during the sliding movement of the operation member 2, and hence satisfactory operability can be expected.

In the variable operation sensation input device 1 according to the embodiment, the protrusion portions 6c and 8c are slidably inserted in the guide grooves 2c and 2d extending in the Y direction of the operation member 2, and the protrusion portion 7c is slidably inserted in the guide groove 2e extending in the X direction of the operation member 2. Accordingly, it is possible to smoothly and rotationally drive the driving members 6 to 8 by the use of the sliding movement of the operation member 2, and hence to expect satisfactory operability. However, an engagement structure may be adopted in which the protrusion portions provided in the operation member 2 are slidably inserted in the corresponding guide portions provided in the driving members 6 to 8 and formed in a groove shape or an elongated hole shape.

In the variable operation sensation input device 1 according to the embodiment, the assisting driving member 8 is provided which meshes with the tooth portion 6c so as to rotate in the opposite direction of the first driving member 6, but the assisting driving member 8 may be omitted. However, when the assisting driving member 8 engages with the operation member 2 while the protrusion portion 8c of the assisting driving member 8 is line-symmetric with the protrusion portion 6c of the first driving member 6 as in the embodiment, it is desirable in that the rotation of the operation member 2, which is a cause for concern, is prevented during the sliding movement thereof. That is, when the assisting driving member 8 is not provided, the operation member 2 may slightly rotate as the operation member 2 slides in the X direction to change a position relative to the protrusion portion 6c of the first driving member 6. However, when the protrusion portion 8c of the assisting driving member 8 engages with the operation member 2, such undesired rotation can be prevented in advance.

Figure 13:
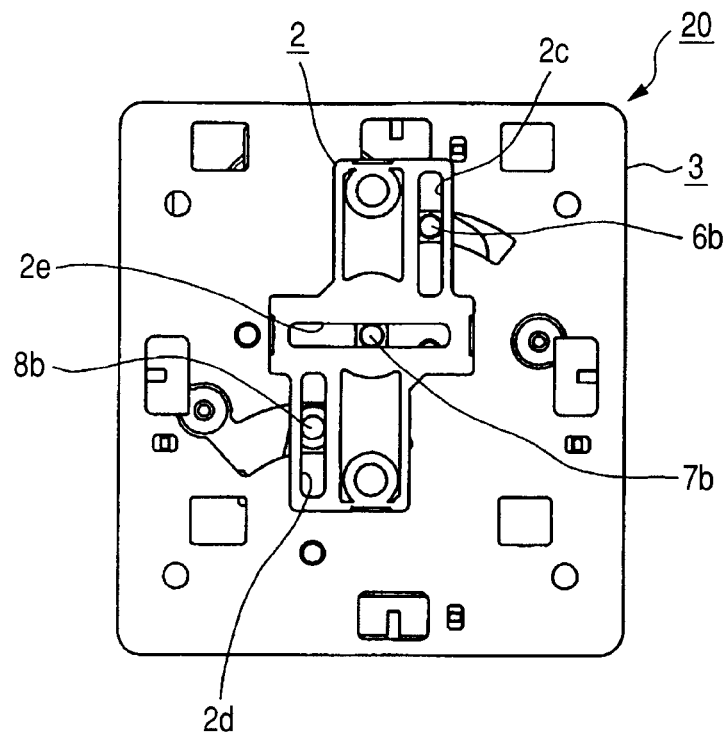
FIG. 13 is a plan view illustrating the variable operation sensation input device according to a second embodiment of the invention.
Figure 14:
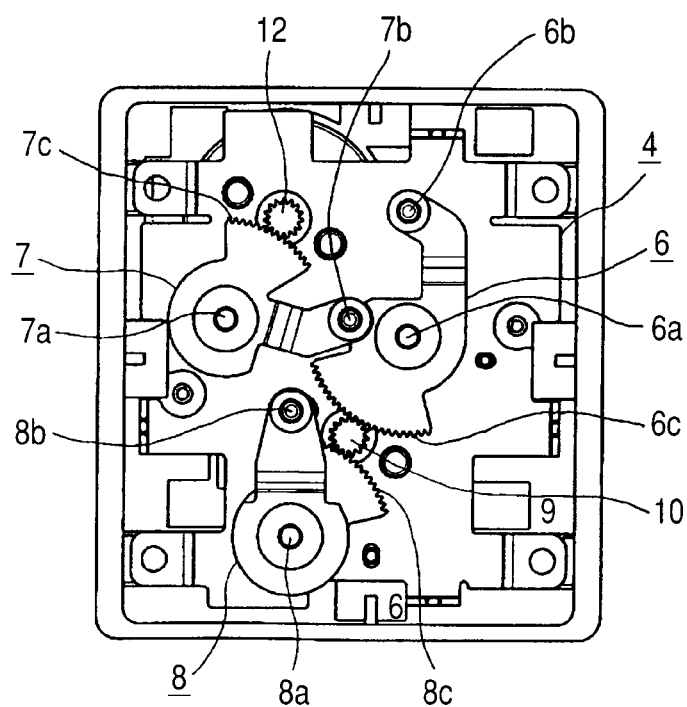
FIG. 14 is a plan view illustrating a state where the operation member and the upper support plate are removed from the input device.
Figure 15:
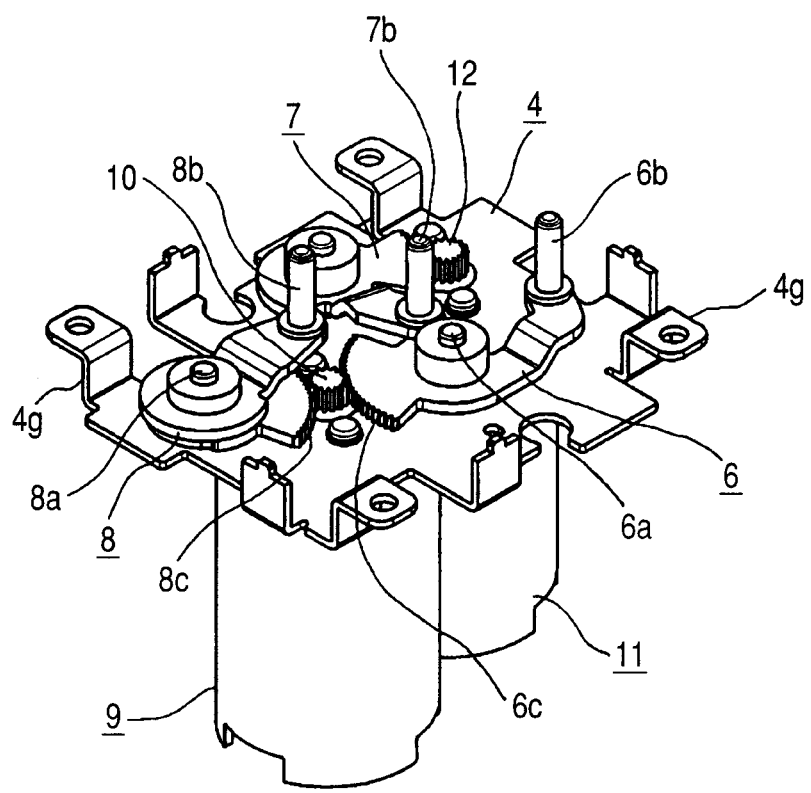
FIG. 15 is a perspective view illustrating the main components of the input device.

Next, a variable operation sensation input device 20 according to a second embodiment of the invention will be described with reference to FIGS. 13 to 15. Further, in FIGS. 13 to 15, since the same reference numerals are given to the components corresponding to FIGS. 1 to 12, the repetitive description thereof will be appropriately omitted.

The variable operation sensation input device 20 according to the second embodiment is different from the variable operation sensation input device 1 according to the first embodiment in that the gear 10 fixed to the motor shaft 9a of the first motor 9 is interposed between the tooth portion 6c of the first driving member 6 and the tooth portion 8c of the assisting driving member 8, and the protrusion portion (the first engagement portion) 6b of the first driving member 6 and the protrusion portion (the assisting engagement portion) 8b of the assisting driving member 8 move together via the gear 10. The other configurations are basically the same as those of the first embodiment.

In the variable operation sensation input device 20 according to the embodiment, the fan-shaped tooth portion 6c formed in the first driving member 6 does not directly mesh with the fan-shaped tooth portion 8c formed in the assisting driving member 8, and the gear 10 fixed to the motor shaft 9a of the first motor 9 is interposed between both tooth portions 6c and 8c. Accordingly, the first driving member 6 and the assisting driving member 8 rotate in the opposite directions via the gear 10, and the protrusion portion (the first engagement portion) 6b and the protrusion portion (the assisting engagement portion) 8b move together. Therefore, the power transmission is performed at one meshing portion between both the first driving member 6 and the assisting driving member 8 and the first motor 9. For this reason, it is possible to suppress the rattling, caused by backlash of the meshing position, in both the first driving member 6 and the assisting driving member 8. Further, since the rotation force of the first motor 9 is directly transmitted to not only the first driving member 6, but also the assisting driving member 8, it is possible to generate a more direct operation sensation.

In the variable operation sensation input device 20 according to the embodiment, the support shaft 8a as the rotation center of the assisting driving member 8 is disposed on the outside, and the protrusion portion 8b inserted in the guide groove 2e of the operation member 2 is disposed in the vicinity of the gear 10. Accordingly, it is possible to make the distance between the protrusion portion 6b of the first driving member 6 and the protrusion portion 8b of the assisting driving member 8 shorter than that of the first embodiment, and thus to promote a decrease in the size of the entire input device.

In the variable operation sensation input device 20 according to the embodiment, a plurality of bent pieces 4g is formed in the peripheral edge portion of the metal plate used as the lower support plate 4, and the upper support plate 3 and the lower support plate 4 are integrated with each other via the bent pieces 4g, thereby defining a gap between both support plates 3 and 4 so as to dispose the driving members 6 to 8 or the gears 10 and 12 therein. Accordingly, each of the bent pieces 4g of the lower support plate 4 has the same function as that of the spacer 5 of the first embodiment. For this reason, the number of components is decreased, and hence the cost of the device is decreased.

It should be understood by those skilled in the art that various modifications, combinations, sub-combinations and alterations may occur depending on design requirements and other factors insofar as they are within the scope of the appended claims of the equivalents thereof.

What is claimed is:

1. A variable operation sensation input device comprising:
   an operation member configured to slide within a plane including first and second directions perpendicular to each other;
   a first driving member including a first engagement portion configured to engage with the operation member and to be driven by sliding movement of the operation member in the first direction;
   a second driving member including a second engagement portion configured to engage with the operation member and to be driven by sliding movement of the operation member in the second direction;
   a first motor connected to the first driving member via a first power transmission section;
   a second motor connected to the second driving member via a second power transmission section;
   a first detection section configured to detect a movement state of the operation member in the first direction;
   a second detection section configured to detect a movement state of the operation member in the second direction; and
   a control section configured to control the first and second motors on the basis of outputs of the first and second detection sections,
   wherein each of the first and second driving members is axially supported so as to be rotatable along the plane around a respective axis perpendicular to the plane.

2. The variable operation sensation input device according to claim 1, wherein one of the operation member and the first driving member includes a first guide portion which extends in the second direction and is formed in a groove shape or an elongated hole shape, and the other of the operation member and the first driving member includes a first protrusion portion which is slidably inserted in the first guide portion, and
   wherein the first engagement portion is the first protrusion portion formed in the first driving member or the first guide portion formed in the first driving member.

3. The variable operation sensation input device according to claim 1, wherein one of the operation member and the second driving member includes a second guide portion which extends in the first direction and is formed in a groove shape or an elongated hole shape, and the other of the operation member and the first driving member includes a second protrusion portion which is slidably inserted in the second guide portion, and
   wherein the second engagement portion is the second protrusion portion formed in the second driving member or the second guide portion formed in the second driving member.

4. The variable operation sensation input device according to claim 1, further comprising:
   an assisting driving member axially supported so as to be rotatable along the plane around an axis, the assisting driving member including an assisting engagement portion configured to engage with the operation member and to be driven by the sliding movement of the operation member in the first direction, and
   wherein the first engagement portion of the first driving member and the assisting engagement portion of the assisting driving member are configured to move together.

5. The variable operation sensation input device according to claim 4, wherein the first driving member and the assisting driving member mesh with each other at a position thereof equally distanced from respective rotation centers and rotate in opposite directions.

6. The variable operation sensation input device according to claim 4, further comprising:
   a gear connected to a rotation shaft of the first motor and interposed between the first driving member and the assisting driving member, the gear meshing with both a tooth portion formed in the first driving member and a tooth portion formed in the assisting driving member.

7. The variable operation sensation input device according to claim 4, wherein one of the operation member and the assisting driving member includes a third guide portion which extends in the second direction and is formed in a groove shape or an elongated hole shape, and the other of the operation member and the first driving member includes a third protrusion portion which is slidably inserted in the third guide portion, and
   wherein the assisting engagement portion is the third protrusion portion formed in the assisting driving member or the third guide portion formed in the assisting driving member.

\* \* \* \* \*